(12) United States Patent
Zhao et al.

(10) Patent No.: US 9,246,696 B2
(45) Date of Patent: Jan. 26, 2016

(54) MRSVP-TE BASED FAST REROUTE IN FACILITY (1:N) PROTECTION MODE

(71) Applicant: Futurewei Technologies, Inc., Plano, TX (US)

(72) Inventors: Katherine Zhao, San Jose, CA (US); Ying Chen, Santa Clara, CA (US); Qianglin Quintin Zhao, Boxborough, MA (US); Tao Zhou, Beijing (CN); Renwei Li, Fremont, CA (US); Lin Han, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 195 days.

(21) Appl. No.: 13/918,373

(22) Filed: Jun. 14, 2013

(65) Prior Publication Data

US 2013/0336192 A1    Dec. 19, 2013

Related U.S. Application Data

(60) Provisional application No. 61/659,888, filed on Jun. 14, 2012.

(51) Int. Cl.
*H04L 12/18* (2006.01)
*H04L 12/761* (2013.01)
*H04L 12/707* (2013.01)
*H04L 12/703* (2013.01)
*H04L 12/723* (2013.01)
*H04L 12/801* (2013.01)
*H04L 12/913* (2013.01)
*H04W 4/06* (2009.01)
*H04W 72/00* (2009.01)

(52) U.S. Cl.
CPC ............ *H04L 12/1863* (2013.01); *H04L 45/16* (2013.01); *H04L 45/22* (2013.01); *H04L 45/28* (2013.01); *H04L 45/50* (2013.01); *H04L 47/15* (2013.01); *H04L 47/724* (2013.01); *H04W 4/06* (2013.01); *H04W 72/005* (2013.01)

(58) Field of Classification Search
CPC .. H04W 4/06; H04W 72/005; H04L 12/1863; H04L 47/15; H04L 47/724; H04L 45/16; H04L 45/50; H04L 45/22; H04L 45/28
See application file for complete search history.

(56) References Cited

U.S. PATENT DOCUMENTS

| 8,477,600 B2 * | 7/2013 | Yong et al. ................. 370/225 |
| 2006/0159009 A1 * | 7/2006 | Kim et al. ................. 370/216 |

(Continued)

OTHER PUBLICATIONS

Berger, L., et al., "GMPLS Segment Recovery," May 2007, 26 pages.

(Continued)

*Primary Examiner* — Jay P Patel
(74) *Attorney, Agent, or Firm* — Conley Rose, P.C.; Grant Rodolph; Brandt D. Howell

(57) ABSTRACT

An apparatus comprising a memory, and a processor coupled to the memory and configured to transmit a backup Label Switched Path (LSP) multicast Resource Reservation Protocol-Traffic Engineering (mRSVP-TE) path request (PATH) message upstream, wherein the backup LSP PATH message requests reservation of a first backup LSP to protect a first primary LSP configured to transmit multicast data, and wherein the backup LSP PATH message is transmitted to support a facility mode one to many (1:N) fast reroute protocol.

20 Claims, 7 Drawing Sheets

(56) References Cited

U.S. PATENT DOCUMENTS

| | | | | |
|---|---|---|---|---|
| 2006/0256712 | A1* | 11/2006 | Imajuku et al. | 370/218 |
| 2008/0123524 | A1* | 5/2008 | Vasseur et al. | 370/228 |
| 2008/0225716 | A1* | 9/2008 | Lange | 370/232 |
| 2009/0185478 | A1* | 7/2009 | Zhang | 370/216 |
| 2010/0177631 | A1* | 7/2010 | Chen et al. | 370/221 |
| 2011/0022881 | A1* | 1/2011 | Nakata | 714/2 |
| 2011/0211445 | A1* | 9/2011 | Chen | 370/221 |
| 2011/0280123 | A1* | 11/2011 | Wijnands et al. | 370/228 |
| 2013/0016605 | A1* | 1/2013 | Chen | 370/221 |
| 2013/0089100 | A1* | 4/2013 | Zhao et al. | 370/395.5 |
| 2013/0208582 | A1* | 8/2013 | Wijnands et al. | 370/218 |
| 2014/0003803 | A1* | 1/2014 | Sfeir et al. | 398/7 |

OTHER PUBLICATIONS

Zhao, K., et al., "Fast Reroute Extensions to Receiver-Driven RSVP-TE for Multicast Tunnels," draft-zlj-mpls-mrsvp-te-frr-00.txt, Jul. 6, 2012, 24 pages.
Foreign Communication From a Counterpart Application, PCT Application No. PCT/US2013/045948, International Search Report dated Sep. 2, 2013, 4 pages.
Foreign Communication From a Counterpart Application, PCT Application No. PCT/US2013/045948, Written Opinion dated Sep. 2, 2013, 9 pages.
Foreign Communication From a Counterpart Application, PCT Application No. PCT/US2013/045950, International Search Report dated Oct. 28, 2013, 4 pages.
Foreign Communication From a Counterpart Application, PCT Application No. PCT/US2013/045950, Written Opinion dated Oct. 28, 2013, 9 pages.
Ping, P., Ed., et al., "Fast Reroute Techniques in RSVP-TE," draft-pan-rsvp-fastereroute-00.txt, XP015033696, Mar. 4, 2012, 31 pages.
Zhao, Q., et al., "Protection Mechanisms for Label Distribution Protocol P2MP/MPSMP Label Switched Paths," draft-zhao-mpls-mldp-protections-02.txt, XP015082049, Mar. 13, 2012, 26 pages.
Zhao, K., et al., "Fast Reroute Extensions to Receiver-Driven RSVP-TE for Multicast Tunnels," draft-zlj-mpls-mrsvp-te-frr-00.txt, XP015083802, Jul. 6, 2012, 24 pages.
Aggarwal, Ed., R., et al., Extensions to Resource Reservation Protocol—Traffic Engineering (RSVP-TE) for Point-to-Multipoint TE Label Switched Paths (LSPs), RFC 4875, May 2007, 50 pages.
Pan, Ed, P., et al., "Fast Reroute Extensions to RSVP-TE for LSP Tunnels," RFC 4090, May 2005, 38 pages.
Awduche, D., et al., "RSVP-TE: Extensions to RSVP for LSP Tunnels," RFC 3209, Dec. 2001, 61 pages.
Berger, Ed., L., et al., "Generalized Multi-Protocol Label Switching (GMPLS) Signaling Resource Reservation Protocol-Traffic Engineering (RSVP-TE) Extensions," RFC 3473, Jan. 2003, 42 pages.
Le Faucheur, F., et al., "Requirements for Support of Differentiated Services-aware MPLS Traffic Engineering," RFC 3564, Jul. 2003, 22 pages.
Braden, Ed., R., et al., "Resource Reservation Protocol (RSVP)—Version 1 Functional Specification," RFC 2205, Sep. 1997, 112 pages.
Bradner, S., "Key Words for use in RFCs to Indicate Requirement Levels," RFC 2119, Mar. 1997, 3 pages.
Andersson, L., et al., "The Multiprotocol Label Switching (MPLS) Working Group decision on MPLS signaling protocols," RFC 3468, Feb. 2003, 11 pages.
Rosen, E., et al., "Multiprotocol Label Switching Architecture," RFC 3031, Jan. 2001, 61 pages.
Li, R., et al., "Receiver-Driven Multicast Traffic Engineered Label Switched Paths," draft-lzj-mpls-receiver-driven-multicast-rsvp-te-00.txt, Internet-Draft, Mar. 4, 2012, 25 pages.
Li, R., et al., "Receiver-Driven Multicast Traffic-Engineered Label-Switched Paths," draft-lzj-mpls-receiver-driven-multicast-rsvp-te-02.txt, Internet-Draft, Oct. 23, 2012, 33 pages.
Zhao, K., et al., "Fast Reroute Extensions to Receivers-Driven RSVP-TE for Multicast Tunnels," draft-zlj-mpls-mrsvp-te-frr-01.txt, Internet-Draft, Jan. 9, 2013, 25 pages.
Office Action dated Jan. 27, 2015, 19 pages, U.S. Appl. No. 13/918,358, dated Jun. 14, 2013.

* cited by examiner

MRSVP-TE BASED FAST REROUTE IN FACILITY (1:N) PROTECTION MODE

CROSS-REFERENCE TO RELATED APPLICATIONS

The present application claims priority to U.S. Provisional Patent Application 61/659,888, filed Jun. 14, 2012 by Katherine Zhao, et. al., and entitled "mRSVP-TE based Fast Reroute in Facility (1:N) Protection Mode," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data Centers (DCs) may comprise servers configured to transmit data to downstream hosts, such as end user devices, private network servers, etc. For example, server(s) may substantially simultaneously stream video and/or other live data to a plurality of hosts. The servers may be traditional servers and/or virtual machines (VMs) operating on computer hardware, for example in cloud based DCs. Substantially simultaneously streaming substantially identical data content to a plurality of hosts or other network nodes may be referred to as multicasting. Such data may be encoded in discrete packets and forwarded toward user terminals through the DCs core network. Multicast data packets may be routed through the core network using various techniques in the Operational Systems Interconnect (OSI) model data link layer and/or network layer, which may also be referred to as layer 2 and layer 3, respectively.

SUMMARY

In one embodiment, the disclosure includes an apparatus comprising a memory, and a processor coupled to the memory and configured to transmit a backup Label Switched Path (LSP) multicast Resource Reservation Protocol-Traffic Engineering (mRSVP-TE) path request (PATH) message upstream, wherein the backup LSP PATH message requests reservation of a first backup LSP to protect a first primary LSP configured to transmit multicast data, and wherein the backup LSP PATH message is transmitted to support a facility mode one to many (1:N) fast reroute protocol.

In another embodiment, the disclosure includes a computer program product comprising computer executable instructions stored on a non-transitory computer readable medium such that when executed by a processor cause a network element (NE) to receive a primary LSP PATH message from a first downstream node, wherein the primary LSP PATH message requests reservation of a primary LSP for downstream transmission of multicast data, assign an inner label to the primary LSP for use in association with a backup LSP, and send the inner label downstream via a backup mRSVP-TE reserve (RESV) message.

In another embodiment, the disclosure includes a method comprising sending, by a Merge Point (MP), a first PATH message toward a Point of Local Repair (PLR) over a primary route to initiate a primary LSP setup, checking whether a backup LSP has been created to protect a primary LSP between the PLR and the MP, and if no backup LSP is available, initiating backup LSP setup, wherein backup LSP setup comprises calculating a backup route by taking PLR as an endpoint of the backup LSP, and sending a second PATH message toward the PLR hop-by-hop over the backup route.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
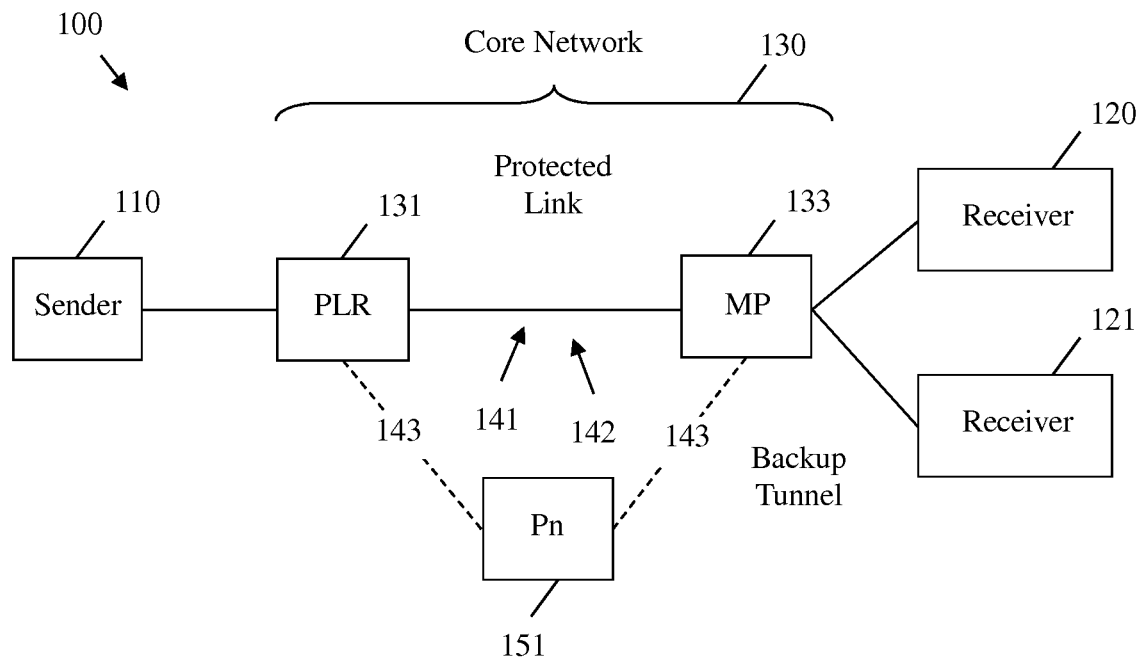
FIG. 1 is a schematic diagram of an embodiment of a multicast enabled network architecture for LSP link protection.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Networks, such as DC core networks, may route packets using Multiprotocol Label Switching (MPLS), which may be a scalable, protocol agnostic, data carrying mechanism. In MPLS, labels may be assigned to each packet. As a packet is transmitted through the network, intermediate network nodes (e.g. routers) may make packet routing and/or switching decisions based on the contents of the label without the need to review the contents of the underlying packet. A path across an MPLS network that may be traversed by a packet via label switching may be referred to as an LSP. MPLS may be discussed further in Internet Engineering Task Force (IETF) document Request For Comments (RFC) 3031, which is incorporated by reference.

MPLS may be employed to transmit substantially the same data to a plurality of receivers using multicasting techniques. An MPLS network may create label based multicast trees using Resource Reservation Protocol-Traffic Engineering (RSVP-TE), which may be discussed in IETF documents RFC 3209 and RFC 4875, which are incorporated by reference. Such multicast trees may allow data packets to be sent downstream toward the receivers. Network nodes positioned as branches of the tree may replicate packets, which may result in distributing processing associated with packet replication across the tree instead of requiring the source to perform packet replication. Such distribution methods may increase the scalability of the system, as a single node may be unable to perform sufficient packet replication to support a large number of users.

MPLS networks transmitting data using RSVP-TE may allow for high quality and high speed transmission of data. However, hardware and/or software failure in the network may result in poor performance while such problems are detected and addressed. As such, MPLS systems may employ a fast reroute protocol as discussed in IETF document RFC 4090, which is incorporated by reference. The fast reroute protocol, which is also known as MPLS local restoration and/or MPLS local protection, may be employed to reserve backup LSPs to protect primary LSPs. When a link and/or a node along a primary protected LSP fails, traffic from the failed section of the LSP may be quickly rerouted to the backup LSP until the failure(s) are remedied and/or until the LSPs can be permanently rerouted and/or reoptimized. The fast reroute protocol may allow traffic to be rerouted on the order of tens of milliseconds, which may prevent entities external to the DC from experiencing any significant change in data flow.

IETF document draft-lzj-mpls-receiver-driven-multicast-rsvp-te-02, which is incorporated by reference, discusses mRSVP-TE, which may be an alternate embodiment for multicasting data across MPLS systems. In mRSVP-TE, resource reservation for multicast may be controlled by a downstream receiver node instead of by an upstream transmitter node, as may be the case in multicasting under RFC 4875. As such, the fast reroute protocol, which may also be controlled by an upstream transmitter node, may not be interoperable with mRSPV-TE.

Disclosed herein is method, apparatus, and/or system to support fast rerouting for multicast traffic in an MPLS network employing mRSVP-TE in facility mode. In facility mode, a plurality of LSPs may be protected by a single backup LSP, which may result in one to many (1:N) protection scheme. Downstream nodes, such as border routers and/or other nodes located at the edge of the core network, may receive a request for multicast data from node(s) positioned outside of the core network, such as hosts and/or nodes positioned in an access network. In response to such request(s), the downstream node may transmit a PATH message upstream toward an upstream node acting as a PLR to reserve resources for a primary LSP for multicast data transmission in accordance with draft-lzj-mpls-receiver-driven-multicast-rsvp-te-02. The PLR node, which may be positioned along the primary LSP, may receive the PATH message and allocate one or more labels to the primary LSP using Upstream Label Allocation (ULA). The PLR node may allocate a primary LSP label for downstream communication on the primary LSP and an inner label for downstream communication in conjunction with a backup LSP. The primary LSP label may be the same label as the inner label. The primary LSP label and/or inner label may be transmitted to the downstream node via a RESV message along the primary path to setup the primary LSP. The downstream node may also determine if a potential backup LSP exists that may protect the primary LSP. Upon determining that a potential backup LSP exists, the downstream node may transmit a PATH message along the backup path toward the PLR. The PLR node may receive the backup PATH message, allocate a backup LSP label for the backup LSP, and respond by transmitting a RESV message downstream along the backup path to setup the backup LSP. The RESV message may comprise the backup LSP label and the inner label. Once the backup LSP is reserved, if either a link or a node positioned downstream of the PLR node and along the primary LSP fails, the PLR may obtain both the backup LSP label for the backup LSP and the inner label assigned to the primary LSP from a local Forwarding Information Base (FIB). The PLR may encapsulate multicast data with the inner label and the backup LSP label and forward the multicast data along the backup LSP. Nodes along the backup LSP may forward the data based on the backup LSP label, but may not review the inner label. A downstream node positioned on both the primary LSP and backup LSP and acting as a merge point (MP) may pop off the backup LSP label and may merge the data with data from the primary LSP by routing the data according to the inner label. Such routing may allow the MP to distinguish between data from a plurality of LSPs that are rerouted through the backup LSP. The backup LSP may be temporary and may be employed until the network can perform a reconvergence procedure to reoptimize the data flow along a more optimal primary LSP. In another embodiment, a backup LSP tree may be employed to backup a primary LSP tree. The devices and methods disclosed herein may be further discussed in IETF document draft-zlj-mpls-mrsvp-te-frr-01, which is incorporated herein by reference.

The present disclosure may employ the following terms, which may be defined as follows: (1) Multicast LSP (mLSP) may be a Point-to-Multipoint (P2MP) or Multipoint-to-Multipoint (MP2MP) or other MP2MP path LSP comprising of one or more sub-LSPs or other sub-paths; (2) mRSVP-TE may be receiver-driven multicast RSVP-TE wherein LSP tunnel setup is initiated by a data receiver instead of a data sender; (3) PLR may be a Label Switch Router (LSR) or other node configured to detect local failure event(s) and redirect traffic from a protected mLSP to a backup mLSP tunnel designed to take over traffic forwarding until the protected tunnel is repaired; (4) Merge Point (MP) may be an LSR or other node configured to initiate the setup of a backup LSP in which the PLR is the root of the backup LSP and configured to merge traffic from a backup LSP with a primary LSP at the level of forwarding plane; (5) Node (N) may be a node that will protected by a backup LSP or other backup path; (6) a backup Path node (Pn) may be any node on the backup LSP or other backup path protecting a node N or a link of the protected LSP or other protected path; (7) a Root may be a router or other node that acts as a root for an mLSP such that multicast contents may enter the root and be distributed to leaf routers along a P2MP and/or MP2MP LSP or other path; (8) Fast ReRoute (FRR) Domain may be a set of links and LSRs that compose a protected sub-LSP (or other sub-path) and backup LSP (or other backup path), and which may be located between a PLR and MP(s); (9) upstream may mean a device, data, and/or thing is oriented and/or positioned toward a data stream source from a network location; and (10) downstream may mean a device, data, and/or thing is oriented and/or positioned toward a data stream receiver from a network location.

As discussed herein, Fast Reroute technology may provide millisecond-level protection in case of node and/or link failures. FRR may employ some local repair mechanisms to meet fast reroute requirements by computing and provisioning backup tunnels in advance of failure and by redirecting traffic to such backup tunnels as close to a failure point as possible.

The fast reroute extensions to RSVP-TE may be specified in IETF documents RFC 4090 and RFC 4875. Such extensions may operate with sender-driven RSVP-TE, but may not be applicable to the receiver driven RSVP-TE for multicast tunnels as described in IETF document draft-lzj-mpls-receiver-driven-multicast-rsvp-te-02.

In a receiver-driven paradigm such as mRSVP-TE, the procedure to set up an LSP tunnel may be inverted from that in sender-driven RSVP-TE. As such, a backup mLSP setup and failover handling mechanism may be different specifications for sender-driven RSVP-TE. From the signaling point of view, the behavior of PLR and MR may be inverted from the sender-driven paradigm of RSVP-TE. The setup for a backup mLSP may be initiated by MP with PLR being taken as the root of a P2MP/MP2MP tree. The RSVP PATH message may be sent from MP towards PLR with FAST_REROUT, DETOUR, as well as other FRR related objects conveyed in a PATH message. The RSVP RESV message may be sent from PLR towards MP carrying FRR information such as the inner label used to represent a protected mLSP tunnel, etc.

On the other hand, from the packet forwarding point of view, the behavior of PLR and MP may be similar to the sender-driven RSVP-TE. The traffic switchover and redirecting may be initiated by PLR, and the data traffic may be merged at MP in a similar manner as specified for the sender-driven RSVP-TE.

FRR link protection may aim to protect a direct link between two LSRs. An LSR at one end of the protected link may be called a PLR, and the LSR located at the other end of the protected link may be called an MP. A backup LSP whose setup is originated at MP and terminated at PLR may be established to protect the primary LSP crossing over the protected link. The LSRs over the backup path may be called Pn. The connected LSRs and links used for FRR and LSP protection may be called an FRR domain (e.g. PLR 131, MP 133, Pn 151, and LSPs 141, 142, and 143 in network 100, PLR 231, MP 233, Pns 251-252, N 235, and LSPs 241, 242, and 243 in network 200, PLR 331, MPs 333 and 337, Pns 351-354, N 335, and LSPs 341-343 and 345-346 in network 300, and PLR 431, MPs 433 and 437, Pns 451 and 452, N 435, and mLSPs 441 and 443 in network 400, respectively).

In an FRR domain constructed by mRSVP-TE, the MP may initiate both the primary and the backup LSP setup at the signaling control plane, and may merge traffic from the backup LSP into the primary LSP at the data forwarding plane. The PLR may work with the MP to set up the LSP at the signaling control plane accordingly, may detect link failure, and may initiate local repair at the data forwarding plane.

On the control plane, the backup LSP may be set up along with its primary LSP setup. The PATH/RESV refresh messages may be transmitted over both protected and backup LSPs before failover. On the data plane, there may be two implementation options for traffic forwarding. One option is that traffic may not be forwarded on backup LSP tunnel until a failure is detected and the local repair takes place. The second option is to forward traffic on both protected and backup mLSPs before failover. The LSR at the Merge Point may then drop packets coming from the backup path before switchover. The second option may further reduce traffic switchover time at the cost of extra overhead and bandwidth sub-optimization.

Two independent methods for doing fast reroute may have been developed. One backup method is called detour backup and is especially designed for 1:1 protection. The other fast reroute method may be called facility backup and may be especially designed for 1:N protection, where N can be equal to or greater than 1. From the point of view of applications, the facility backup method can support both 1:N and 1:1. From a technical point of view, these are two different methods which may require different implementations with respect to label stacks when forwarding packets.

In detour mode, the detour backup may create a dedicated backup LSP to protect a primary LSP and may employ a single MPLS label for packet encapsulation. Such implementation may be simpler but may consume more label resources. The facility backup may create a common LSP to protect a set of LSPs that have similar backup constraints. This method may take advantage of MPLS label stacking and may dual-label encapsulation, which may save some label resources compared to the detour backup method. The embodiments discussed herein may be primarily applicable to facility mode. However, such embodiments may be employed in detour mode as well.

FIG. 1 is a schematic diagram of an embodiment of a multicast enabled network 100 architecture for LSP link protection. Network 100 may comprise at least one multicast sender 110 and a plurality of multicast receivers 120 and 121 associated as part of a multicast tree. A multicast tree with a plurality of senders 110 may referred to as a MP2MP multicast tree and a multicast tree with a single sender 110 may be referred to as a P2MP multicast tree. Sender 110 may transmit multicast data to receivers 120 and 121 across a core network 130 comprising a plurality of interconnected nodes and links. Specifically, core network 130 may comprise a node configured to act as an MP 133, a node configured to act as a PLR 131, and a node configured to act as a Pn 151. The nodes may be connected by a protected primary LSP 141-142 link and backup LSP 143. Backup LSP 143 may protect both LSP 141-142 in a 1:N protection scheme such as FRR facility backup mode. Backup LSP 143 may be represented by a dashed line and primary LSPs 141-142 may be represented by a solid line for purposes of clarity.

Sender 110 may be a machine capable of transmitting multicast data to a plurality of receivers 120 and/or 121. For example, sender 110 may comprise a server, a cluster of servers, a cloud based VM, or other entity capable of retrieving and transmitting multicast data. Sender 110 may be positioned inside a DC. Multicast data multicast by the sender 110 may be any data that may be replicated and substantially simultaneously transmitted (e.g. streamed) to a plurality of receivers 120 and/or 121. For example, multicast data may comprise live streaming audio and/or video such as Internet Protocol (IP) television (TV), internet radio, and other streaming media. Sender 110 may transmit multicast data to receivers 120 and/or 121 via a logical multicast tree. For example, sender 110 may transmit multicast data downstream across the multicast tree and interested receivers 120 and/or 121 may join the tree and receive the data. Sender 110 may be the sole source of multicast data in a P2MP multicast tree structure and/or one of a plurality of sources of multicast data in a MP2MP multicast tree. Sender may or may not be configured to receive data and/or requests from downstream nodes. For example, a P2MP sender 110 may not receive data from downstream nodes, while a MP2MP sender 110 may receive data from downstream nodes.

Core network 130 may be a network of interconnected nodes (e.g. NEs) configured to transmit data between a sender 110 and receivers 120 and/or 121. For example, core network 130 may be located in a DC and transmit data from the edge of the DC to servers located inside the DC. The core network 130 may comprise aggregation nodes configured to aggregate traffic from a plurality of servers, a switching fabric to control the transmission of data streams (e.g. flows), and border routers positioned at the edge of the data center domain and configured to control data access to and from the DC domain. The core network 130 may be configured to support MPLS. Specifically, core network 130 nodes may be configured to calculate LSPs, create Forwarding Equivalency Classes (FECs) for the LSPs, and assign labels for each FEC. The network nodes may share labels and/or other MPLS and/or routing information using MPLS protocols and store such labels and/or information in a FIB. When a data packet is received at the upstream edge of an MPLS domain, a core network 130 node may attach a label to the packet based on FEC according to a local FIB and forward the packet downstream. Subsequent network nodes may act as LSRs and switch the packets according to label based on FIB entries, which may cause each packet to flow downstream along an associated LSP. For example, an LSR may receive a packet with an upstream label, look up the upstream label in the FIB, find a downstream label that is bound to the upstream label and/or FEC in the FIB, replace the upstream label with the downstream label, and forward the packet to the next node in the LSP. LSRs may only review the labels and not the underlying packet, which may result in increased switching efficiency. As the underlying packet may not be reviewed by the LSRs, an LSP may be considered a tunnel. Upon reaching the edge of an MPLS domain, for example at a core network 130 border router, the edge node may remove the label(s) and forward the packet toward the receivers 120 and/or 121, for example across an access network, using IP routing, Media Access Control (MAC) routing, or other OSI layer 2 and/or layer 3 protocols.

Receivers 120 and 121 may be any devices configured to receive multicast data. For example, receivers 120 and/or 121 may comprise residential gateways (RGs), customer premises equipment (CPEs), IP set top boxes, servers, smart phones, personal computers (PCs), tablet PCs, IP TVs, and/or other devices configured to receive streaming video, audio, or other multicast data. Receivers 120 and/or 121 may also be referred to as hosts and may be positioned at the edge of access network(s), inside residential networks, and/or inside other private networks. A receiver 120 and/or 121 wishing to receive multicast data may transmit an Internet Group Management Protocol (IGMP) membership report, a multicast listener discovery (MLD) membership report, a Protocol Independent Multicast (PIM) join request, or other request to join a multicast tree toward the sender 110. In addition or in the alternative, such join requests may be sent on behalf of the receiver 120 and/or 121 by other node(s). A join request may be forwarded upstream until such request is received by a node that is a member of the requested multicast tree. The receiver 120, 121, and/or nodes between the receiver(s) and the first member node may then become members of the multicast tree. A node of a multicast tree with a single downstream receiver 120 and/or 121 may be referred to as a leaf and a node with a plurality of downstream receivers 120 and/or 121 on a plurality of interfaces may be referred to as a branch. Branches may replicate packets received on upstream interfaces for transmission on the plurality of downstream interfaces.

Core network 130 may comprise network nodes PLR 131, MP 133, and Pn 151. For example, PLR 131, MP 133, and Pn 151 may be core network 130 switching fabric nodes. In addition and/or in the alternative, MP 133 may comprise a core network 130 edge and/or MPLS domain edge border router. PLR 131, an MP 133, and a Pn 151 may be connected as shown in FIG. 1. MP 133 may receive join request message(s) from receivers 120 and/or 121 on downstream interface(s) and join the multicast tree on behalf of the receivers using 120 and/or 121 MPLS signaling. In response to the join request from the receiver(s) 120 and/or 121, MP 133 may send PATH requests toward sender 110 via PLR 131 to create primary LSP 141 and/or 142. Primary LSPs 141-142, once created, may transmit multicast data from the upstream edge of the MPLS domain to MP 133 via PLR 131 for further transmission toward the interested receivers 120 and/or 121. PATH requests for a primary LSP such as LSPs 141-142 may be sent via the shortest and/or most optimal path through the MPLS domain that can be determined by MP 133. PLR 131 may receive a PATH request for a primary LSP 141 and/or 142 and may assign a label for use in association with downstream communications across primary LSP 141-142 as well as a label to identify each primary LSP for rerouting purposes as discussed below. The label for primary LSP communications may be referred to as a primary LSP label and the rerouting label may be referred to as an inner label. In some embodiments, the primary LSP label may be assigned the same value as the inner label. PLR 131 may respond to the primary PATH message with a RESV request indicating primary LSP 141 and/or 142 has been setup. The RESV message may comprise the primary LSP label and/or the inner label.

MP 133 may also calculate alternate path(s) to protect primary LSP 141-142 in case of failure. For example, MP 133 may wish to protect a link between MP 133 and PLR 131 against failure. MP 133 may calculate, and request via PATH message, backup LSP 143 (e.g. backup tunnel) across a backup path passing through Pn 151. Backup LSP 143 may protect the link between MP 133 and PLR 131 against failure, but may be a less optimal path than LSP 141-142. MP 133 may be positioned on both the primary LSP 141 and the backup LSP 143 and may be a merge point for both LSPs. The MP may not necessarily be the originator of the primary LSP(s) 141-142, but may be the first LSR entering an FRR domain along the primary route. PLR 131 may receive the backup PATH message and may allocate a label for downstream communication over the backup LSP, and which may be referred to as a backup LSP label. The backup LSP label and/or the inner label may be forwarded downstream to the MP 133 along the backup path in a RESV message. MP 133 may request additional LSP(s) 142 by transmitting additional PATH messages. The PLR 131 may respond by creating unique inner labels for each LSP 141-142. After requesting each LSP 142, MP 133 may determine whether a backup LSP already exists to protect the new LSP 142. New backup LSPs may not be requested because backup LSP 143 may protect all LSPs 141-142 in a 1:N protection scheme. Inner labels for each LSP 141-142 may be transmitted to MP 133 and/or Pn 151 via RESV messages over the primary path traversing LSP 141-142 and/or the backup path traversing backup LSP 143.

In the event of a failure along LSP 141-142 between PLR 131 and MP 133, PLR 131 may employ an FRR protocol to mitigate multicast data interruption. For example, PLR 131 may detect a downstream link failure along LSP 141-142 and obtain a downstream label for LSP 143, which may be bound to the information for LSP 141 in the PLR's 131 FIB. PLR 131 may also obtain inner labels for LSP 141-142. PLR 131 may encapsulate multicast packets for LSPs 141-142 with associated inner labels. PLR may then encapsulate the inner labels and packets with the label for LSP and switch such packets to LSP 143. Such actions by PLR 131 may result in a local repair of LSP 141. The rerouted multicast packets may traverse LSP 143 and be received by MP 133. MP 133 may determine the label received with the multicast packets is associated with the backup LSP 143, may obtain forwarding information from MP's 133 local FIB, and may forward multicast packets downstream in a manner consistent with the forwarding of multicast packets prior to the failure. For example, MP 133 may distinguish between traffic over LSP 141 and LSP 142 by removing the backup LSP label from each multicast packet and routing the multicast packet according to the inner label. As a result, nodes downstream of MP 133 may be substantially unaware of the link failure and service interruptions of the multicast tree may be minimized.

Backup LSP 143 may not be the same path as protected LSP 141-142 to ensure protection against failure. As such, backup LSP 143 may be sub-optimal. Backup LSP 143 may be temporarily employed by the network to substantially prevent service interruption while the failed link is repaired. In addition or in the alternative, core network 130 may employ a network reconvergence algorithm in the MPLS control plane to recalculate and/or reoptimize LSPs for use in the MPLS forwarding plane based on the existence of the link failure. Backup LSP 143 may be torn down once network reconvergence is complete.

As discussed herein, network 100 may employ mechanisms and procedures for mRSVP-TE fast reroute by using the facility backup method. The term backup LSP may be used to denote an LSP in a facility mode for 1:N protection. The backup LSP 143 may differ from a detour LSP in detour mode in that one single backup LSP 143 may be used to protect multiple primary LSPs 141-142. In an embodiment, two labels may be used for the backup LSP 143 with the inner label being used to indicate which primary LSP 141-142 is being protected.

MP 133 may send a RSVP PATH message toward PLR 131 over the primary route (e.g. LSP 141-142). For link protection purpose, both the MP 133 and PLR 131 may be directly connected by the link being protected (e.g. LSP 141-142), hence the PATH message may be sent from the MP 133 to the PLR 131 directly upstream. Once the PATH message is sent out, MP 133 may execute backup LSP procedures. For example, the MP 133 may check whether there has been a backup LSP created to protect the link between PLR 131 and MP 133. If a backup LSP is found, the MP 133 may skip further processes (e.g., do not send a PATH message over the backup route (e.g. LSP 143) for LSP setup). However, this does not mean that no process is employed for link protection. The PLR 131 may allocate an inner label for each newly created primary LSP (e.g. LSP 141-142) and may send each inner label to Pn(s) 151 and MP 133 via RESV messages. If there is no backup LSP available, MP 133 may initiate backup LSP 143 setup.

MP 133 may check whether there is a backup route available for link protection. The backup route calculation can be done by running Constrained Shortest Path First (CSPF) on a link state database produced by Interior Gateway Protocol (IGP) protocols with Traffic Engineering (TE) extensions. If the CSPF stack returns 'no backup route found' after the backup calculation, MP 133 may not perform the backup LSP setup. If at least one backup route is found by CSPF stack, MP 133 may select the shortest route and initiate the backup LSP setup. The PATH message may be sent from MP 133 to Pn 151 and relayed to PLR 131. MP 133 may consider PLR 131 as the end point of the detour LSP and may send a PATH message towards PLR 131 hop-by-hop. For example, in network 100 the backup LSP PATH message may be sent by MP 133 to Pn 151 and then relayed to PLR 131. Upon receipt of the PATH message, the PLR may send back a RESV message towards the MP through the Pn(s). The transit Pn(s) node may relay the PATH/RESV messages without any special process required for the link protection. The backup LSP setup may be completed once the RESV message is received and processed by the MP.

As a backup LSP may protects one or more primary LSPs, the facility protection scheme may use two labels for packet forwarding. The outer label may be used for regular packet forwarding hop-by-hop over the backup LSP 143, while the inner label may be used to represent a primary LSP (e.g. LSP 141 and/or 142) and may be used by the MP 133 to merge traffic forwarded over the backup LSP 143 to its corresponding primary LSP. Multiple primary LSPs may share a common outer label while the inner label may be unique for each protected LSP 141 and/or 142. Label assignment and use may be discussed hereinbelow. Links may be denoted herein using the form x-y- . . . , where x denotes a starting node and y denotes an end node and/or intermediate node directly connected to via a link. For clarity, labels denoted as Lp may relate to primary LSPs while labels denoted as Lb may relate to backup LSPs.

For example, primary LSP 141 may be created first. MP 133 may assign a downstream label Lp12 for LSP 141 being protected and may send the label to PLR 131 via a PATH message over route MP-PLR. Because the primary LSP 141 may be the first LSP created over this route, MP 133 may also assign a downstream label Lb2 for the backup LSP 143 and may send label Lb2 to Pn 151 via a PATH message over the backup route {MP-Pn-PLR}. Pn may allocate a downstream label Lb3 and may send label Lb3 to PLR 131 via a PATH message.

Once PATH messages are received from MP 133 and Pn 151, respectively, PLR 131 may allocate an inner label to represent the primary LSP 141 for the backup LSP 143. For example, label Lp12 may be used as the inner label to represent primary LSP 141 over the backup LSP 143. An LSR at MP 133 may use the inner label to locate the corresponding primary LSP 141. The inner label may be propagated from PLR 131 to MP 133 by a RESV message. PLR 131 and MP 133 may be the only LSRs in network 100 that actually see, use, and/or process the inner label, while other transit node Pn(s) 151 may not process the inner label. In another example, labels Lp12 and Lb3 may be allocated by PLR 131, label Lb2 may be allocated by Pn 151, and such labels may be transmitted downstream via RESV messages.

The process for the second or additional primary LSPs (e.g. LSP 142) protected by the same backup LSP 143 may be different from that for the first primary LSP 141. MP 133 and/or PLR 133 may not allocate any new downstream label for the backup LSP 143 since the backup LSP 143 for the first primary LSP 141 may be shared between all the primary LSPs protected by the same backup LSP. But the PLR 131 may be required to allocate an inner label for each newly created primary LSP (e.g. LSP 142) and sends such inner labels to MP 133 hop-by-hop via a RESV message.

The FIB entries of the nodes of network 100 may be denoted using the format FRR:(inner label),(incoming outer label)→(outgoing outer label), Next Hop (NHOP). When MP 133 allocates and/or receives the downstream label Lp12 for the primary 141, an entry 'Lp12→Lp-pe1, PE1' may be added into MP's 133 FIB, wherein PE1 may denote a label towards receiver 120. Another FRR entry 'FRR: Lp12, Lb2→Lp-pe1, PE1' may be added when MP receives a RESV message that carries an inner label Lp12 and binding information with LSP 141. So the MP 133 may have two forwarding entries for each protected LSP. In this example, MP 133 may maintain four entries in its FIB for the two protected paths LSP 141 and LSP 142: (1) Lp12→Lp-pe1, PE1; (2) Lp22→Lp-pe2, PE2; (3) FRR: Lp12, Lb2→Lp-pe1, PE1; and (4) FRR: Lp22, Lb2→Lp-pe2, PE2, where PE2 may denote a label towards receiver 121 and Lp22 may denote a label for primary LSP 142.

PLR 131 may create a forwarding entry for a primary LSP 141 and/or 142 whenever it receives a PATH message for the setup of a new primary LSP. For each primary path, once PLR 131 receives the PATH message from the backup route 143, PLR 131 may allocate an inner label for the primary LSP and create an FRR entry in its FIB. The PLR 131 may have the following entries for the two protected LSPs 141 and 142: (1) Lp11→Lp12, MP; FRR: Lp12, Lp11→Lb3, MP; (2) Lp21→Lp22, MP; FRR: Lp22, Lp21→Lb3, MP, where Lp11 and Lp21 may denote label for receiving data from an upstream node for primary LSPs 141 and 142, respectively. In may be noted that the transit router(s) Pn 151 may use the outer label for packet forwarding without reviewing or modifying the inner label(s). Pn's 151 FIB may comprise the following entries: (1) FRR: Lp12, Lb3→Lb2, MP; (2) FRR: Lp12, Lb3→Lb2, MP.

Before a link failure is detected, PLR 131 may encapsulate user packets with a single label Lp12 and/or Lp22 and forward the packet to MP 133. MP 133 may also use a single label encapsulation and may forward the packets to receivers 120 and/or 121. After a link failure is detected, the PLR 131 may encapsulate traffic with two labels. The outer label Lb2 may be used for packet forwarding over the backup path 143, while the inner label Lp12 and/or Lp22 may be used to map traffic to the corresponding primary LSP 141 and/or 142. MP 133 may pop out outer label Lb2 if needed, swap inner label Lp12 with Lp-pe1 or Lp22 with Lp-pe2, and then forward packets to receiver 120 and/or 121, respectively. After a link failure occurs, the network 100 may reconverge. PLR 131 may be notified as soon as a new best path for the primary LSPs 141 and/or 142 may be found and activated. Then PLR 131 may tear down the backup LSP 143, release backup labels, and clean up entries in its FIB.

Figure 2:
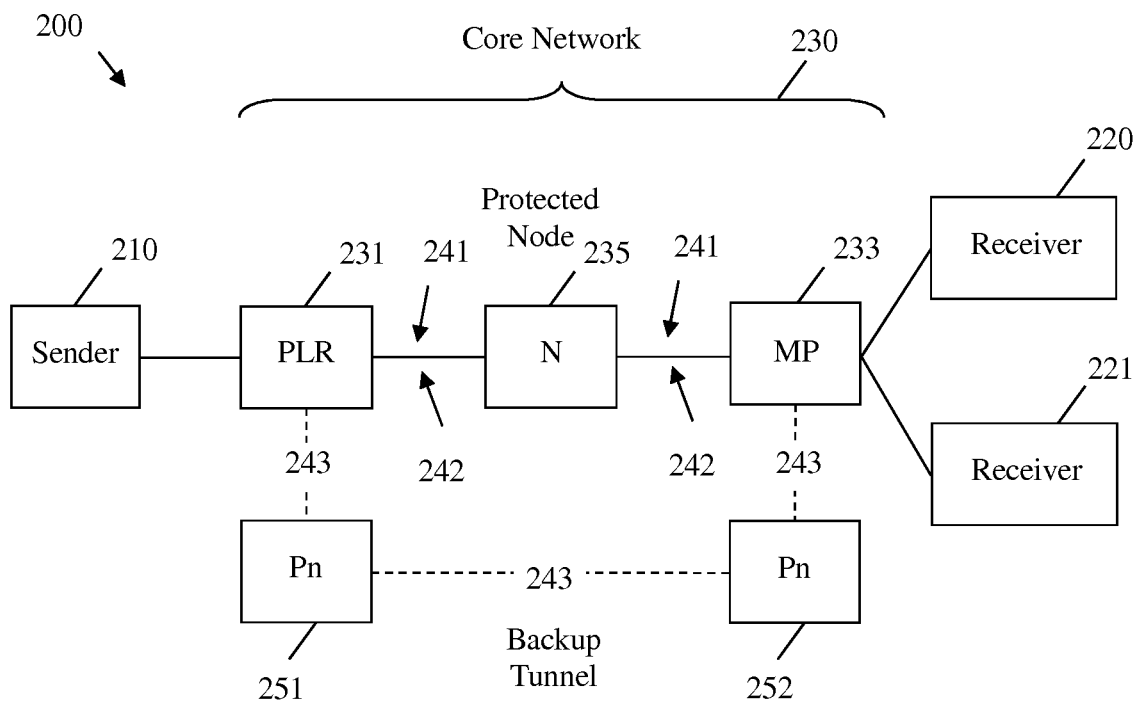
FIG. 2 is a schematic diagram of an embodiment of a multicast enabled network architecture for LSP node protection.
Figure 3:
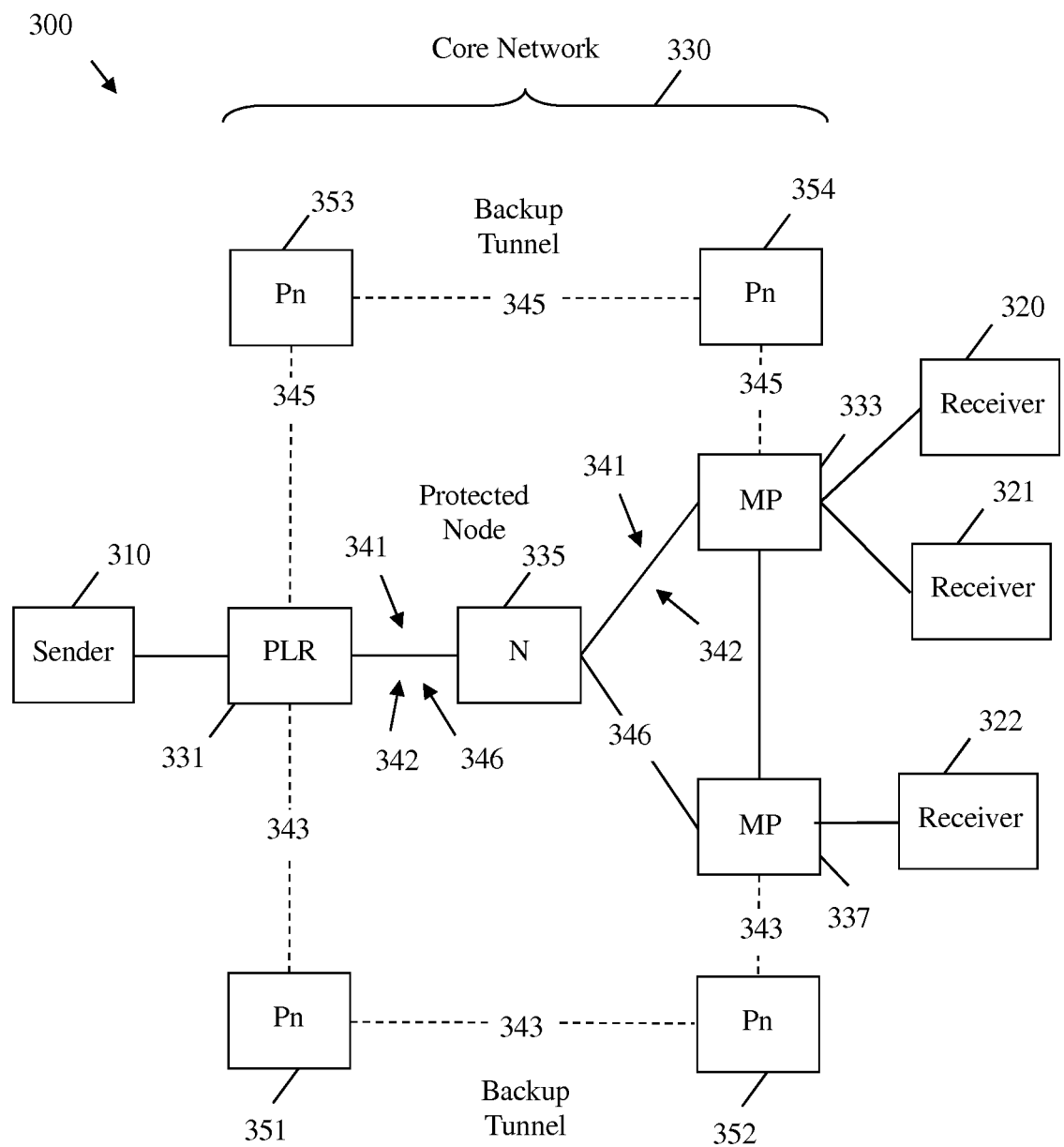
FIG. 3 is a schematic diagram of another embodiment of a multicast enabled network architecture for LSP node protection.
Figure 4:
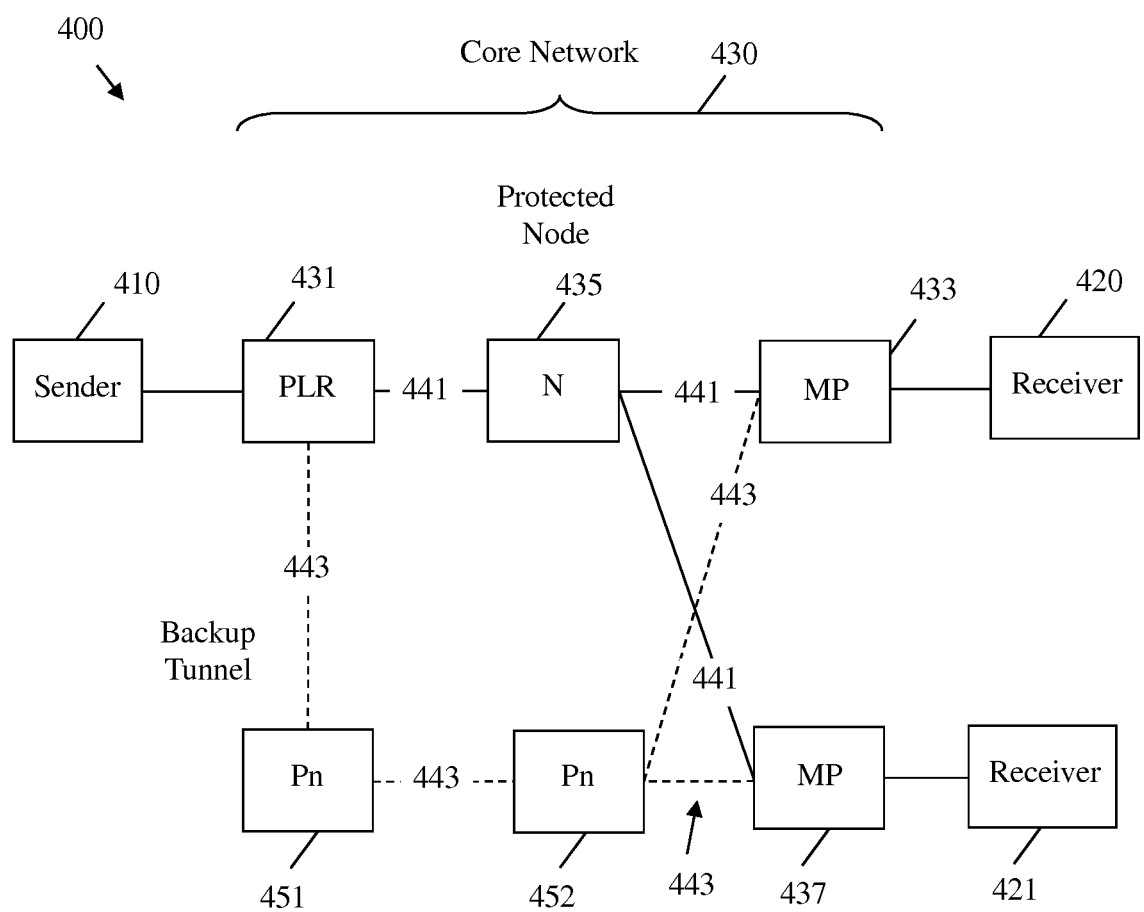
FIG. 4 is a schematic diagram of another embodiment of a multicast enabled network architecture for LSP node protection.

Referring to FIGS. 2-4, node protection may be a technique used to protect a node N that resides between PLR and MP over a primary LSP. N may denote a node being protected over a primary LSP, with an upstream node playing the role of PLR and a downstream node playing the role of MP. Pn may denote a transit node over a backup LSP. It should be noted that there may be multiple Pn's over a backup tunnel. Pn may not play a significant role for FRR but operate as a regular LSR to receive and transmit multicast data and signaling messages over backup LSP(s).

Besides P2P node protection, mRSVP-TE may be employed to provide P2MP and MP2MP node protection as shown in FIGS. 2-4. It should be noted that the same protection mechanism may be commonly used for both P2MP and MP2MP with differences as discussed herein. There may be two methods to protect a P2MP multicast tree, one that uses a P2MP tree as a backup LSP to protect a primary mLSP (see FIG. 4), and the other that uses multiple P2P LSPs to protect a P2MP mLSP (see FIG. 3). A router that detects a node/link failure may have pre-determined which alternate reroute path such router should use to forward traffic while the failure is being fixed. The alternate backup path may be established before a protected LSP is broken. Backup route computation and configuration required for local repair purposes may be completed prior to failure occurrence so that failover time may be reduced to minimum.

FIG. 2 is a schematic diagram of an embodiment of a multicast enabled network architecture 200 for LSP node protection. Network 200 may comprise a sender 210, a core network 230, receivers 220 and 221, a PLR 231, an MP 233, and Pns 251-252, which may be substantially similar to sender 110, core network 130, receivers 120 and 121, PLR 131, MP 133, and Pn 151, respectively. Network 200 may further comprise N 235, which may be any network node, such as an LSR, along a primary LSP to be protected by a backup LSP. Network 200 may further comprise primary LSPs 241-242, which may be substantially similar to primary LSPs 141-142, but may traverse N 235. MP 233 may setup a backup LSP 243 (e.g. traversing Pn 251 and Pn 252) in a substantially similar manner to backup LSP 143. In the event of a failure at N 235, PLR 231 may employ a facility mode FRR protocol to reroute multicast data from LSP 241-242 across backup LSP 243 to detour around failed node N 235 until N 235 may be repaired and/or until network reconvergence is complete. MP 233 may distinguish between LSP 241 traffic and LSP 242 traffic by removing the outer backup label associated with backup LSP 243 and obtaining the inner label associated with LSP 241 and/or LSP 242.

FIG. 3 is a schematic diagram of another embodiment of a multicast enabled network architecture 300 for LSP node protection. Network 300 may comprise a sender 310, a core network 330, receivers 320, 321, and 322, a PLR 331, MPs 333 and 337, a N 335, and Pns 351-354, which may be substantially similar to sender 210, core network 230, receivers 220-221, PLR 231, MP 233, N 235, and Pns 251 and 252, respectively. Network 300 may further comprise primary LSP 341, 342, and 346, which may each be substantially similar to primary LSPs 241-242. Primary LSP 341, 342, and 346 may be configured to transmit the same multicast data, in which case N 335 may act as a branch of a multicast tree and may replicate packets received on an upstream interface for transmission on a plurality of downstream interfaces across LSPs 341-342 and LSP 346. In another embodiment, primary LSPs 341, 342, and 346 may comprise different multicast data. MP 333 may request the creation of backup LSP 345 via Pn 353 and PN 354 to protect primary LSPs 341-342. MP 337 may request the creation of backup LSP 343 via Pn 351 and PN 352 to protect primary LSP 346. As backup LSP 345 may protects both primary LSPs 341-342, network 300 may be operating in facility mode (e.g. 1:N protection).

In the event of a failure of N 335, PLR 331 may employ a FRR protocol to reroute multicast data from LSPs 341-342 across backup LSP 345 and reroute multicast data from LSP 346 across backup LSP 343, respectively, to detour around failed node N 335. In the event of a failure of a link between N 335 and MP 333, PLR 231 may reroute traffic over primary LSPs 341-342, but not reroute traffic over primary LSP 346. In the event of a failure of a link between N 335 and MP 337, PLR 331 may reroute traffic over primary LSP 346, but not reroute traffic over primary LSP 341-342. Such reroutings may persist until the failure is resolve and/or until network reconvergence. As with networks 100 and 200, if LSP 341-342 traffic is rerouted over backup LSP 345, MP 333 may distinguish between LSP 341 traffic and LSP 342 traffic by removing an outer label associated with backup LSP 345 and routing based on an inner label associated with LSP 341 or LSP 342.

It may be noted that network 300 may result when expanding the solutions of networks 100 and/or 200 by adding more MPs and/or receivers. The solution of network's 300 use of a shortest path algorithm to find the shortest backup path from MP 337 to PLR 331 (e.g. backup LSP 343) may result in beneficial latency from the standpoint of receiver 321. However, LSP 343 may result in increased network traffic and label reservations over some other solutions. For example, MP 337 may also calculate the shortest path to the nearest backup route (e.g. LSP 345) via MP 333 (e.g. acting as a Pn for the backup LSP) and create a backup LSP via MP 333 instead of LSP 343. Such a modification may result in a multicast tree protecting a multicast tree as discussed with reference to FIG. 4. Such a modification may involve a longer backup LSP for MP 337, but may free up resources and label allocations in Pns 351-352.

FIG. 4 is a schematic diagram of another embodiment of a multicast enabled network architecture 400 for LSP node protection. Network 400 may comprise a sender 410, PLR 431, N 435, MP 433 and 437, Pn 451 and 452, and receivers 421 and 422, which may be substantially similar to sender 310, PLR 331, N 335, MPs 333 and 337, Pns 351-354, and receivers 320-322. Network 400 may further comprise primary mLSP 441 between PLR 431 and MP 433 via N 435, and between PLR 431 and MP 437 via N 435. As depicted in network 400, primary mLSP 441 may be considered a primary mLSP tree. The creation of primary mLSP 441 may be similar to the creation of primary LSPs in networks 100, 200, and/or 300. Network 400 may also comprise a backup mLSP tree 443. Backup mLSP tree 443 may protect N 435 for mLSP 441. Backup mLSP tree 443 may be created in a similar manner to backup LSPs in network 100, 200, and 300. For example, upon creation of the first link of primary mLSP 441, the corresponding MP (e.g. MP 433 or 437) may transmit a PATH message toward PLR 431 via Pn 452 and Pn 451 to request creation of a backup LSP. PLR 431 may respond with a RESV message to setup the associated backup LSP. Upon creation of the second link of primary mLSP 441 the corresponding MP (e.g. MP 437 or MP 433) may also send a PATH message toward PLR 431 via Pn 452. Pn 452 may be aware of the first link of the backup mLSP, and my not forward the PATH message to Pn 451. Instead, Pn 452 may respond with a RESV message, which may result in mLSP 443. Pn 452 may or may not be aware of the inner label(s) assigned by PLR 431. PLR 431 may occasionally refresh the LSPs and/or mLSPs of network 400 to prevent LSP timeout. As such, PLR 431 may include the associated inner labels in RESV or similar messages used in refreshing the LSPs and/or mLSPs. In some embodiments, Pn 452 may receive such inner labels via RESV or similar messages upon refresh. N 435 may be considered a branch node of the mLSP 441. Pn 452 may be considered a branch node of mLSP 443. A branch mode may be a node that receives multicast data on an upstream interface, replicates the received multicast data, and forward the replicated data to a plurality of downstream nodes over a plurality of interfaces.

As discussed herein, two example networks for node protection in the facility protections scheme may be illustrated in FIGS. 3 and 4, respectively. The network shown in FIG. 4 may use a P2MP and/or a MP2MP backup LSP 443 to protect a branch node N 435, and the network shown in FIG. 3 may use multiple LSPs (e.g. backup LSPs 343 and 345) to protect the node N 335. Network 400 may reduce traffic replication on the backup LSP, and the network 300 may suffer from traffic overhead because multiple backup sub-LSPs (e.g. backup LSPs 343 and 345) may be used. Selection between the network 300 and/or 400 may be a design option. Network 400 may be employed as described below to implement a node protection mechanism in the facility protection scheme. However, it should be noted that network 300 may be implemented in a similar manner by a person of ordinary skill in the art.

Specific procedures may be needed for P2MP and/or MP2MP tree setup and label allocation. Assume that receiver 421 joins a primary P2MP tree structure in the embodiment of FIG. 4. Receiver 420 and/or a LSR upstream of receiver 420 may send a multicast join and/or RSVP PATH message, respectively, to MP 433 for LSP setup. The PATH message may be relayed to PLR 431 through node N 435 being protected. MP 433 may calculate a backup route with a constraint to avoid node N 435 and may initiate backup LSP setup of backup LSP 443 by sending a PATH message over the backup path MP 433-Pn 452-Pn 451-PLR 431. RSVP RESV messages may be sent in return by PLR 431 to MP 433 through the primary PLR 431-N 435-MP 433 and the backup PLR 431-Pn 451-Pn 452-MP 433 routes, respectively.

Later on, another receiver 421 and/or a LSR upstream of receiver 421 may join the P2MP tree by sending a multicast join and/or a PATH message to MP 437. MP 437 may relay the PATH message to node N 435 being protected. Then N 435 may become a branch node, and as such, N 435 may not need to send further PATH message(s) to the PLR 431. MP 437 may perform substantially the same procedure as MP 433 did for the first branch receiver 420-MP 433-N 435. A backup route {MP 437-Pn 452-Pn 451-PLR 431} may be computed by CSPF, and the node Pn 452 may become a branch node that belongs to the backup P2MP tree 443. As such, a PATH message may not be sent by Pn 452 towards the PLR 431. RSVP RESV messages may be sent back by the PLR 431 to MP 437 through the primary route PLR 431-N 435-MP 437 and the backup route MP 437-Pn 452-Pn 451-PLR 431 respectively.

Whenever additional primary sub-LSP(s) are set up as far as the same node N 435 and PLR 431 are connected, all such primary sub-LSPs can be protected by the single backup LSP 443. The procedure to setup additional primary LSPs may be the same as used for the mLSP 441 setup. Specifically, a unique identifier may be allocated to each primary LSP to bind the primary LSP with the backup LSP 433, as discussed below.

In order to achieve 1:n protection in Facility mode, a unique identifier (e.g. an inner label) may be assigned to represent each primary LSP being protected. This identifier may be advertised to all the LSRs in a FRR domain and used for traffic switchover in case of node N 435 failure. There may be many ways to assign and use the identifier. As discussed here, a sample mechanism based upon ULA may be employed to assign a MPLS label (e.g. inner label) and use such label as the identifier of a primary LSP. However, it should be noted that downstream label allocation (DLA) may also be employed. An example of label allocation and FIB entry creation for the node protection of N 435 in Facility mode may be discussed below.

In the FRR domain of network 400, an identical label Lpu may assigned to the following sub-LSPs over the primary mLSP 441: PLR 431-N 435, N 435-MP 433, and N 435-MP 437. Lpu may be allocated by the branch node N 435 for the primary mLSP 441 and may be used as the identifier of the primary mLSP 441. If there are multiple primary mLSPs that cross the same node N 435 and need to be protected by the single backup mLSP 443, multiple unique Lpu labels may be assigned for each of the primary mLSPs accordingly. In order to guarantee the uniqueness of Lpu in node N 435 and MPs (e.g. MPs433 and/or 437), the LSRs may have ULA capability in FRR domain. In addition, an algorithm for ULA assignment and negotiation among the LSRs may be employed.

During normal operation, PLR 431 may encapsulate packets with the label Lpu and forward such packets to node N 435 over the primary mLSP 441. The node N 435 as a branch node may replicate traffic to MP 433 and MP 437 using label Lpu. When a node failure is detected, PLR 431 may redirect traffic to the backup mLSP 443, and two labels may be used for packet encapsulation over the backup mLSP 443 (e.g. an inner label and a backup LSP label). The inner label may be Lpu and may uniquely identify a primary mLSP and the outer label may be allocated by MPs 437 and/or 433, Pns 451-452 using DLA or by PLR 431 and Pns 451-452 using ULA.

Example label allocation and FIB entries of the nodes of network 400 is discussed hereinbelow. For example, for the first primary LSP setup, MP 433 may assign a downstream label Lpdla for the primary LSP link upstream from MP 433 and may send Lpdla to the protected node N 435 via a PATH message. Node N 435 may discard Lpdla and uses ULA to assign a new label Lpu that may be used as a downstream label for N 435 to send packets to MP 433. Node N 435 may send label Lpu to MP 433 via a RESV message. MP 433 may replace its downstream assigned label Lpdla with Lpu. If Lpu has been used by another LSP on the LSR, MP 433 may request node 433 to assign another Lpu by a RSVP notify message. In case of conflict, a ULA negotiation procedure may be executed. MP 433 may also assign a downstream label Lbdla for the backup LSP and sends it to Pn 452 via a PATH message over the backup route MP 433-Pn 452-Pn 451-PLR. Pn 452 may be a branch node and may therefore execute substantially the same procedure as the branch node N 435 on the primary LSP 441. Pn 452 may discard label Lbdla received from the PATH message, may assign a new label Lbu, and may sends Lbu to MP 433 via a RESV message. Once a RESV message is originated by PLR 431 and sent through the backup route, MP 433 may receive an inner label Lpu that represents the primary mLSP 441. MP 433 may add a FRR entry with both inner and outer label in its FIB. MP's 433 FIB may have two forwarding entries for the LSP 441 being protected in Facility mode: (1) Lpu→Lp-pe1, PE1; and (2) FRR: Lpu, Lbu→Lp-pe1, PE1, wherein PE1 denotes receiver 420 and/or a node upstream from receiver 420. With substantially the same process, MP 437 may receive two forwarding entries for the mLSP 441 being protected: (1) Lpu→Lp-pe2, PE2; (2) FRR: Lpu, Lbu→Lp-pe2, PE2, wherein PE2 denotes receiver 421 and/or a node upstream from receiver 421.

As mentioned above, when Pn 452 (e.g. the transit branch node) receives PATH messages from MP 433 and MP 437 respectively, Pn 452 may allocate label Lbu and may send it to each MP. Pn 452 may have two forwarding entries for the backup mLSP 443: (1) FRR: Lpu, Lb5→Lbu, MP 433; (2) FRR: Lpu, Lb5→Lbu, MP 437. Pn 451 may be a transit node and may have only one FRR entry for the backup mLSP 441: FRR: Lpu, Lb4→Lb5, Pn 452.

PLR 431 may receive a PATH message from node N 435 that may carry a downstream label Lpu and a PATH message from Pn 451 that carries a downstream label Lb5. PLR 431 may use Lpu as an inner label for the primary mLSP 441 and sends it towards MPs 433 and/or 437 through Pn 451 by means of RESV message. PLR 431 may maintain two entries in its FIB for a protected mLSP 441: (1) Lp1→Lpu, N 435; (2) FRR: Lpu, Lp1→Lb1, Pn 451. For every add-in primary mLSP being protected by the same backup LSP, PLR may assign an inner label and send it to LSRs across the backup mLSP 443 so that each LSR can add the corresponding FRR entry in its FIB and use this entry to forward traffic over the backup mLSP 443.

If protected node N 435 fails and the failure is detected by PLR 431, PLR 431 may initiate a switchover by redirecting traffic to the backup LSP 443. Packet encapsulation in each LSR over the backup mLSP 443 may be done based on the FRR entries of its FIB. For example, a packet that arrives at PLR 435 and which is supposed to be forwarded to node N 435 by using entry Lp1→Lpu, N 435, may be redirected to Pn 451 based on entry FRR: Lpu, Lp1→Lb4, Pn 451. PLR 431 may encapsulate the packet with Lpu as inner label, Lb4 as outer label and forwards the packet to Pn 451. Pn 451 may swap the outer label for packet forwarding and keep the inner label unchanged. Once the packet reaches MP 433, MP 433 may pop out the outer label, swap the inner label with outgoing label Lp-pe1 and forward the packet to NHOP to receiver 420 with a single label Lp-pe1. The packet de-capsulation and/or encapsulation at MP 433 may be based on the FRR: Lpu, Lbu→Lp-pe1, PE1 entry. Once traffic reaches MP 433, such traffic may then be merged with the primary path downstream. Substantially the same procedure may be applicable to LSR MP 437 for packets forwarded to receiver 421.

Routers that do not belong to the FRR domain may not be impacted by the link failure and local repair procedures. However, the network may eventually re-converge and a new best path to reach the root of the RD P2MP tree structure may be computed by MP 433, MP 437, and/or FRR domain routers downstream thereof. PLR 431 may be notified once the new primary path is determined. PLR 431 may send notification messages to Pn 451, Pn 452, and MP 433, and/or MP 437 so that they may tear down the detour mLSP 443 and withdraw backup labels.

Figure 5:
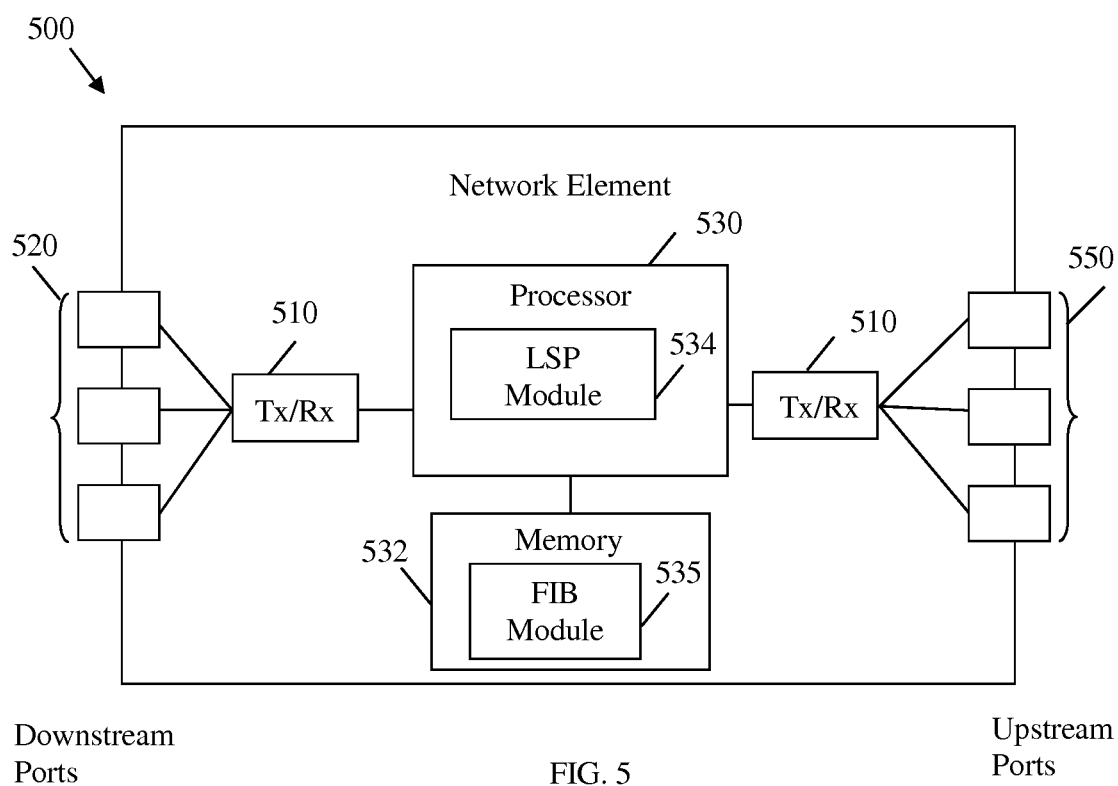
FIG. 5 is a schematic diagram of an embodiment of a NE which may act as a node within a multicast enabled network.

FIG. 5 is a schematic diagram of an embodiment of a NE 500 which may act as a node within a multicast enabled network such as network 100, 200, 300, and/or 400, and may be configured to request and/or reserve LSPs, act as a LSR, and/or perform FRR operations such as PLR 131, 231, 331, and/or 431, MP 133, 233, 333, 337, 433 and/or 437, Pn 151, 251, 252, 351-354 and/or 451-452, and/or N 235, 335, and/or 435. NE 500 may be implemented in a single node or the functionality of NE 500 may be implemented in a plurality of nodes in a core network such as core network 130, 230, 330, and/or 430. In some embodiments NE 500 may also act as other node(s) in network 100, 200, 300, and/or 400. One skilled in the art will recognize that the term NE encompasses a broad range of devices of which NE 500 is merely an example. NE 500 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 500. For instance, the features/methods in the disclosure may be implemented using hardware, firmware, and/or software installed to run on hardware. The NE 500 may be any device that transports frames through a network, e.g., a switch, router, bridge, server, a client, etc. As shown in FIG. 5, the NE 500 may comprise transceivers (Tx/Rx) 510, which may be transmitters, receivers, or combinations thereof. A Tx/Rx 510 may be coupled to plurality of downstream ports 520 (e.g. downstream interfaces) for transmitting and/or receiving frames from other nodes and a Tx/Rx 510 coupled to plurality of upstream ports 550 (e.g. upstream interfaces) for transmitting and/or receiving frames from other nodes, respectively. A processor 530 may be coupled to the Tx/Rxs 510 to process the frames and/or determine which nodes to send frames to. The processor 530 may comprise one or more multi-core processors and/or memory devices 532, which may function as data stores, buffers, etc. Processor 530 may be implemented as a general processor or may be part of one or more application specific integrated circuits (ASICs) and/or digital signal processors (DSPs). Processor 530 may comprise an LSP module 534, which may process PATH requests, process RESV messages, allocate labels, bind labels and/or LSPs, perform label switching, and/or perform any methods disclosed herein. For example, LSP module 534 may perform methods 600, 700, and/or 800 as discussed more fully hereinbelow. Memory devices 532 may comprise an FIB module 535, which may store, update, and/or retrieve labels and/or bindings upon request of the LSP module 534. In an alternative embodiment, the LSP module 534 may be implemented as instructions stored in memory 532, which may be executed by processor 530. In another alternative embodiment FIB module 535 may be implemented in a cache on the processor 530. In another alternative embodiment, the LSP module 534 and the FIB module 535 may be implemented on separate NEs. The downstream ports 520 and/or upstream ports 550 may contain electrical and/or optical transmitting and/or receiving components. NE 500 may or may not be a routing component that makes routing decisions.

It is understood that by programming and/or loading executable instructions onto the NE 500, at least one of the processor 530, LSP module 534, downstream ports 520, Tx/Rxs 510, memory 532, FIB module 535, and/or upstream ports 550 are changed, transforming the NE 500 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 6:
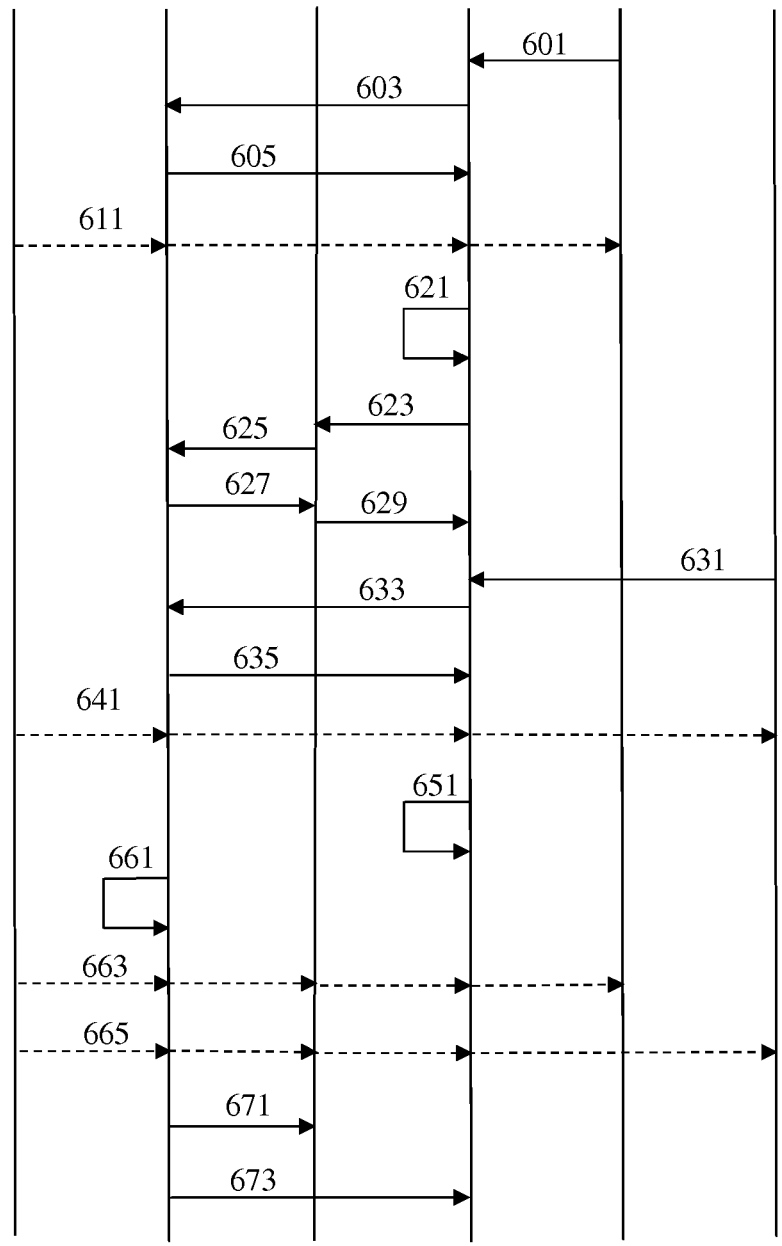
FIG. 6 is a protocol diagram of an embodiment of a method of LSP link protection.

FIG. 6 is a protocol diagram of an embodiment of a method 600 of LSP link protection. Method 600 may be implemented on a network such as networks 100, 200, 300, and/or 400. For example, method 600 may be implemented on a network comprising a sender (e.g. sender 110, 210, 310, and/or 410), a PLR (e.g. 131, 231, 331, and/or 431), an MP (e.g. MP 133, 233, 333, 337, 433, and/or 437), a receiver 1 (e.g. receiver 120, 121, 220, 221, 320, 321, 322, 420, and/or 421) and a receiver 2, which may be substantially similar to receiver 1. At step 601, a receiver 1 may transmit a multicast join request message to MP. The join request may be a PIM join message, an MLD membership report, a IGMP membership report, or other request to join a multicast tree. The MP may receive the join request on a downstream interface. In response to the join request, the MP may request to join the multicast transmit on behalf of the using MPLS signaling. At step 603, the MP may calculate the shortest and/or most optimal path (e.g. primary path) across the MPLS domain toward the root of the multicast tree (e.g. the sender and/or the PLR) and transmit a first PATH message toward the sender on the MPs upstream interface along the primary path. The first PATH message may request the creation of a first primary multicast LSP (e.g. primary LSP 141, 142, 241, 242, 341, 342, 346, 441) along the primary path. The first PATH message may be received by a PLR on a downstream interface. At step 605, the PLR may generate a first primary LSP label and/or a first inner label for the first primary LSP, store the first primary LSP label and/or first inner label in a local FIB, and transmit the first primary LSP label and/or the first inner label to the MP via a RESV message to confirm creation of the first primary LSP. The PLR may also assign an upstream label to the primary LSP to allow for bidirectional communication over the first primary LSP and transmit the upstream label to MP via the RESV message. MP may record all received labels in a local FIB. PLR may already be a member of the requested multicast tree. If PLR is not a member of the multicast tree, PLR may transmit a PATH message toward the sender (e.g. to another upstream node in the MPLS domain) in a manner substantially similar to steps 603 and 605. At step 611, the sender may transmit (e.g. stream) multicast data toward PLR. PLR may retrieve the first primary LSP label from the FIB, attach the first primary LSP label to the multicast data, and forward the data to MP. MP may remove the first primary LSP label and forward the multicast data to receiver 1 using a protocol consistent with the protocol of step 601. The stream of step 611 may continue unless a failure occurs along the primary LSP, the receiver 1 no longer wishes to receive the data, the sender determines to stop transmission, the network is re-optimized, etc.

At step 621, the MP may determine whether a backup LSP (e.g. backup LSP 143, 243, 343, 345, and/or 443) has already been setup that may protect the first primary LSP. If a backup LSP has not been setup, MP may determine if an alternate path exists that may be employed to protect the first primary LSP (e.g. a backup route). The MP may determine that a route through Pn may protect a link of the first primary LSP (e.g. a link between MP and PLR) against failure by traversing the network between MP and PLR without traversing the protected link. If a plurality of alternate paths exists, MP may select the shortest and/or most optimal backup route. At step 623, the MP may transmit a second PATH request along the selected backup path to request the creation of a backup LSP. Pn may receive the backup LSP PATH request of step 623 on a downstream interface. At step 625, Pn may transmit a backup LSP PATH request to PLR. PLR may receive the PATH message of step 625, create a backup LSP label for the backup LSP, save the backup LSP label in the FIB, and bind the backup LSP information to the first primary LSP information in the FIB. At step 627, PLR may transmit a RESV message along the backup route toward MP via Pn to complete the setup of the backup LSP. PLR may include the backup LSP label and/or the first inner label in the RESV message of step 627. At step 629, Pn may store the backup LSP label and/or inner label from the PLR in a local FIB, generate another backup LSP label, store the additional backup LSP label in the local FIB, and forward a RESV message to MP comprising the backup LSP label from Pn and/or the inner label from PLR.

At step 631, receiver 2 may wish to receive multicast data from sender and may transmit a multicast join request message to MP. At step 633 MP may transmit a PATH message to PLR to request a second primary LSP in substantially the same manner as step 603. At step 635, PLR may generate a unique second primary LSP label and/or a unique second inner label for the second primary LSP and send such labels to MP via a RESV message in substantially the same manner as step 605. At step 641, PLR may transmit multicast data from sender toward MP and receiver 2 via the second primary LSP in substantially the same manner as step 611. The multicast data of step 641 may or may not be identical to the multicast data of step 611. At step 651, MP may determine whether a backup LSP has already been setup that may protect the second primary LSP. For example, the backup LSP of steps 623, 625, 627, and 629 may protect the second primary LSP. As the second backup may protect the second primary LSP, MP may bind the previously created backup LSP to the second primary LSP in the local FIB and may not setup a new backup LSP.

At some point subsequent to step 651, a failure may occur at the protected link of the primary LSP (e.g. at a link between PLR and MP). At step 661, PLR may detect the link failure and initiate a FRR protocol to reroute data streaming across the first and second primary LSPs. At step 663, PLR may retrieve the backup LSP label for Pn and the inner label for the primary LSP from the FIB. The PLR may then encapsulate the each packet of the streaming data with the inner label and with the backup LSP label and forward the data to Pn. Pn may use the backup LSP label from the packets to find the backup LSP label allocated by Pn from the local FIB, swap the backup LSP label allocated by PLR with the backup LSP label allocated by Pn, and forward the data to MP. MP may discard the outer backup LSP label, obtain the inner label associated with the first primary LSP, and use the inner label to route the multicast data to receiver 1 and/or merge the data with other data received across the first primary LSP. At step 665, the PLR may forward the data from the second primary LSP to MP in substantially the same manner as step 663. MP may distinguish between the data flows of 663 and 665 based on the inner labels and forward the data from the second primary LSP to receiver 2. The PLR, Pn, and/or MP may be aware of the link failure due to the change in label usage, while the receiver may not be aware of the link failure. PLR, Pn, and/or MP may signal the link failure across the MPLS domain, which may result in a link repair and/or a network reconvergence. Upon completion of link repair and/or a network reconvergence, at steps 671 and 673, the PLR may transmit messages directing Pn and MP to tear down the backup LSP in favor of more optimal primary and/or backup LSPs.

Figure 7:
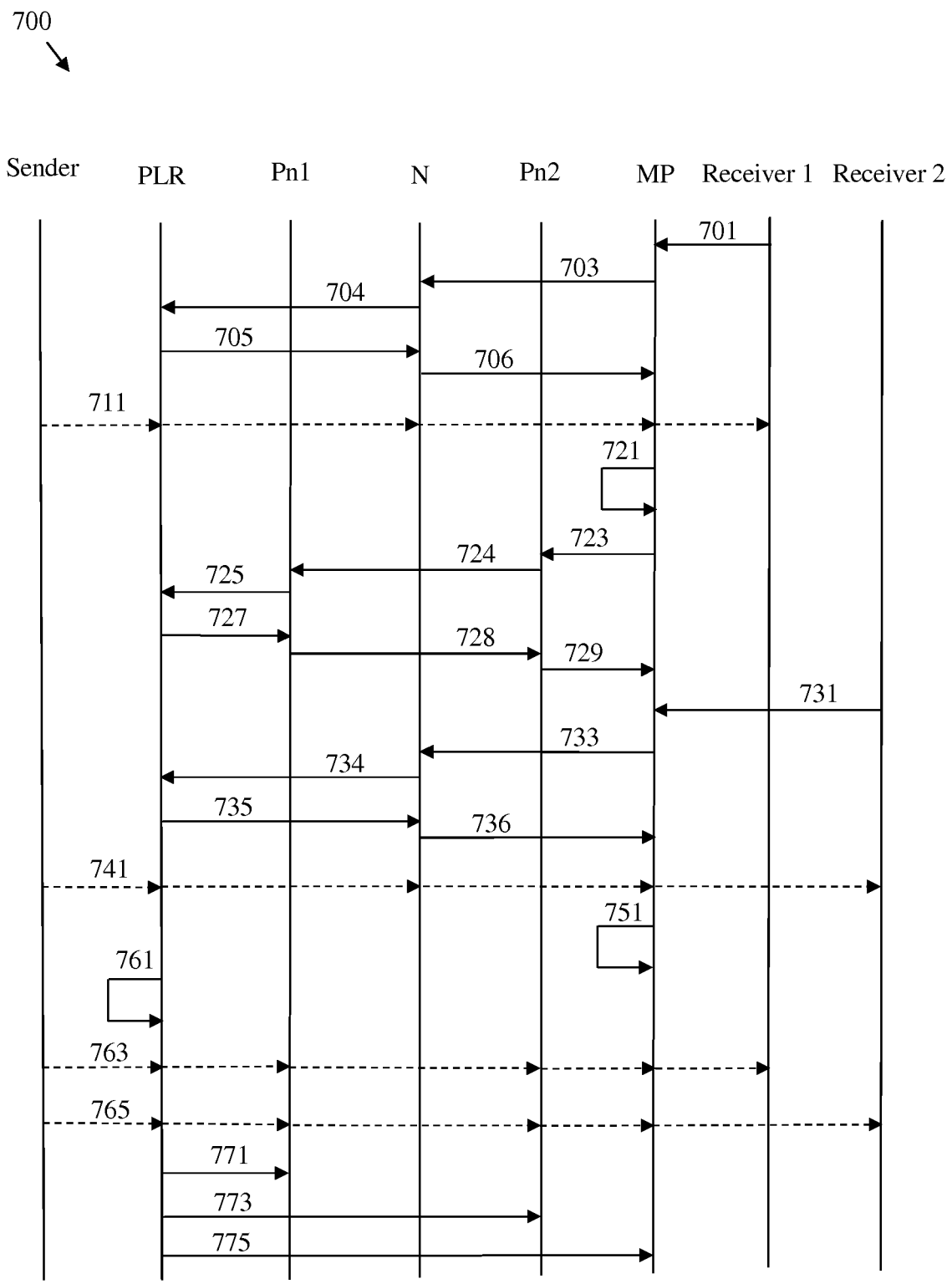
FIG. 7 is a protocol diagram of an embodiment of a method of LSP node protection.

FIG. 7 is a protocol diagram of an embodiment of a method 700 of LSP node protection. Method 700 may be similar to method 600 but may protect a node N (e.g. 235, 335, and/or 435) of networks 200, 300, and/or 400. Step 701 may be substantially similar to step 601. At steps 703-704, MP may transmit a PATH message for a first primary LSP toward PLR via protected node N in a manner similar to step 603. At steps 705-706, PLR may forward a RESV message toward MP via N in a manner similar to step 605. However, N may allocate an additional label for the first primary LSP, replace the first primary LSP label allocated by PLR with the first primary LSP label allocated by N, and forward the first primary LSP label allocated by N and the inner label to MP. At step 711, sender may stream multicast data toward the receiver via the first primary LSP across PLR, N, and MP using label switching in a manner similar to step 611.

At step 721, MP may determine whether a backup LSP is setup and whether a backup path to protect the first primary LSP exists in manner substantially similar to step 621. MP may determine that no backup LSP has been setup and that a backup route exists that traverses Pn1 and Pn2. At steps 723, 724, and 725, MP may send a PATH message toward PLR (e.g. along a path traversing Pn1 and Pn2) requesting a backup LSP. At step 727, 728, and 729, the PLR may respond to the backup PATH request with a RESV message transmitted along the backup route in a manner substantially similar to 627 and 629. As with method 600, the RESV may be employed to transmit upstream allocated labels for upstream communication across the backup LSP as well as backup LSP labels for downstream communication.

At step 731, a receiver 2 may request multicast data as in step 631. At steps 733-734, MP may request a second primary LSP via a PATH message in substantially the same manner as steps 703-704. PLR may assign a unique second primary LSP label and/or a unique inner label and may transmit the labels for the second primary LSP to the MP in a RESV sent via N in steps 735-736 in a manner similar to steps 705-706. At step 741, data for receiver 2 may be transmitted over the second primary LSP in substantially the same manner as step 641. At step 751, MP may determine that the backup LSP protects the second primary LSP and may not request a new backup LSP as in step 651.

At step 761, PLR may discover a failure at node N in a manner similar to step 661. At steps 763 and 765 PLR may initiate a FRR protocol to reroute the multicast data stream of steps 711 and 741, respectively, around failed node N by employing the backup LSP in a manner similar to steps 663 and 665, respectively. PLR may encapsulate the multicast data with the inner label for the associated primary LSP, the backup LSP label for the backup LSP and forward the data to MP via Pn1 and Pn2 for delivery to receiver 1 and receiver 2, respectively. Pn1 and Pn2 may exchange the backup LSP label as the data is forwarded downstream, but may not review the inner label. MP may use the inner label to determine how to route the traffic between receiver 1 and receiver 2, respectively, based on the information in the FIB. At steps 771, 773, and 775 PLR may tear down the backup LSP by sending messages to Pn1, Pn2, and MP, respectively, after repair of reconvergence in a manner similar to steps 671 and 673.

Figure 8:
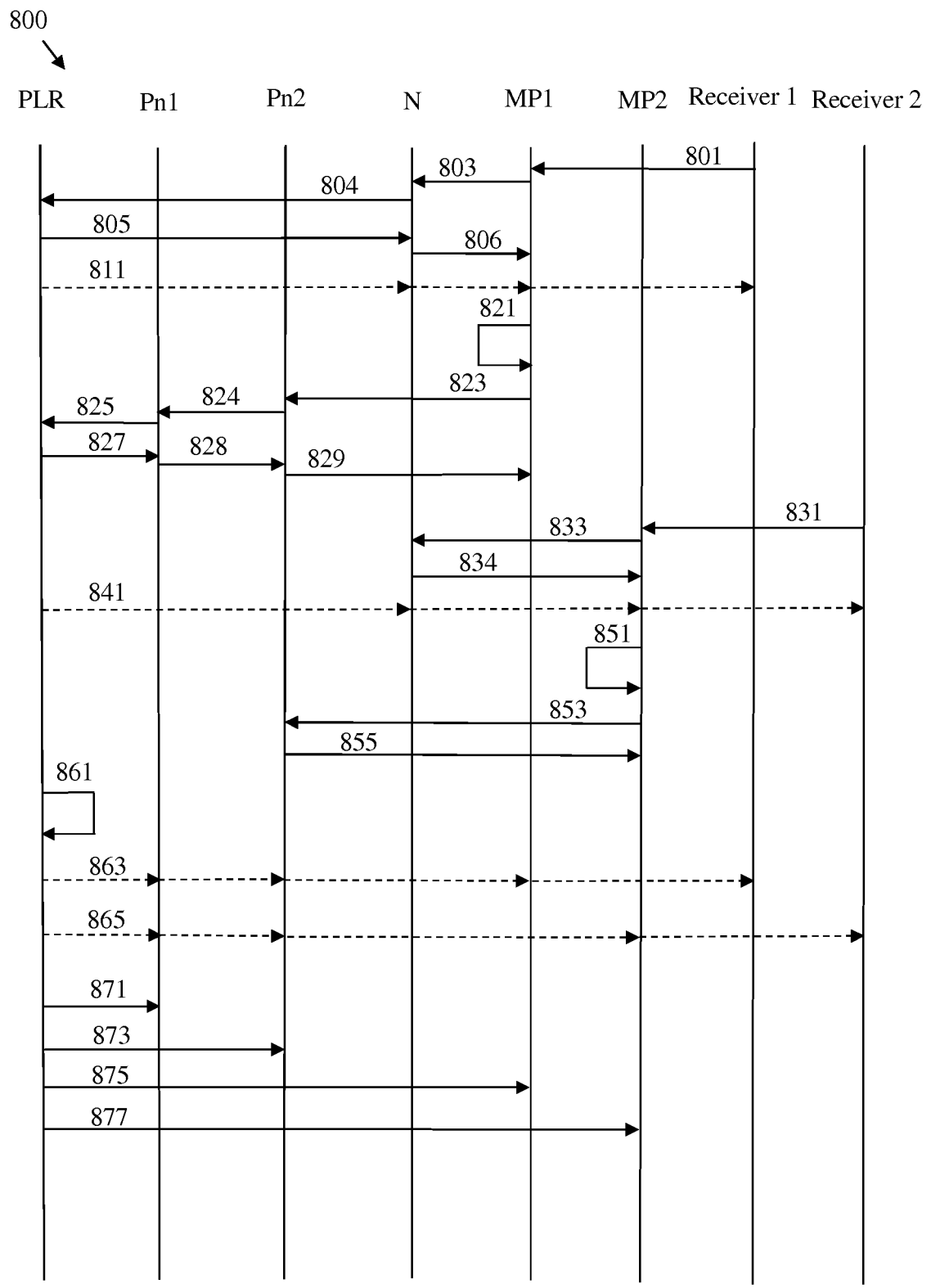
FIG. 8 is a protocol diagram of an embodiment of a method of multicast LSP tree protection.

FIG. 8 is a protocol diagram of an embodiment of a method 800 of multicast LSP tree protection. Method 800 may be similar to method 700 but may protect a primary mLSP (e.g. mLSP 441) with a backup mLSP (e.g. mLSP 443) and may, for example, be implemented on a network such as network 400, where the network comprises a PLR (e.g. PLR 431), a Pn1 (e.g. Pn 451), a Pn2 (e.g. Pn 452), an N (e.g. N 435), an MP1 (e.g. MP 433), a MP2 (e.g. MP 437), a receiver 1 (e.g. receiver 420), and a receiver 2 (e.g. receiver 421). Steps 801, 803, 804, 805, 806, 811, 821, 823, 824, 825, 827, 828, 829, (e.g. setting up a first primary LSP and a first backup LSP) may be substantially similar to steps 701, 703, 704, 705, 706, 711, 721, 723, 724, 725, 727, 728, 729, respectively. At step 831, receiver 2 may send a request to MP2 for multicast data as in step 731. MP2 may send a PATH message at step 833 as in step 733. At step 834, N may already be connected to the first primary LSP and may become a branch node by setting up a second primary LSP. N may allocate a second primary LSP label and may forward the second primary LSP label and/or an inner label assigned by the PLR via a RESV message. N may not transmit the PATH message to the PLR. Data may be forwarded at step 841 as in step 741. At step 851, MP2 may determine whether to request a backup LSP as in step 821. MP2 may determine that a path via Pn2 may protect N. At step 853, MP2 may send a PATH message to Pn2 in a manner similar to step 823. Pn2 may already be a part of a backup LSP after step 829. At step 855, Pn2 may allocate a backup LSP label and forward the label to MP2 via a RESV message. If Pn2 received a copy of an inner label from PLR (e.g. as part of a RESV message in step 829), Pn2 may forward the inner label to MP2 in the RESV message. Pn2 may not forward the PATH message from MP2 toward PLR. As such, Pn2 may be treated as a branch node on a backup mLSP tree that protects the primary LSP tree. PLR may periodically send RESV or similar messages downstream to refresh the primary mLSP and/or the backup mLSP, which may allow all nodes to receive any labels assigned by PLR. At step 861, PLR may detect a fault at N and determine to forward multicast data from the primary mLSP across the backup mLSP in a manner similar to step 761. At step 863 and/or step 865, PLR may encapsulate the multicast data with the allocated inner label and backup LSP label, and forward the data downstream as in steps 763 and/or 765, respectively. Such data may be forwarded by Pn1 to Pn2. Pn2 may act as a branch node and may replicate such packets for transfer downstream to MP1 and/or MP2. MP1 and/or MP2 may then forward data to receiver 1 and/or receiver 2 based on the data packet inner label(s). In some embodiments, Pn2 may review the inner label(s) for routing purposes if the multicast data of step 863 may be different from the multicast data of step 865. PLR may tear down the multicast tree at steps 871, 873, 875, and 877, after network reconvergence by sending messages to all nodes on the backup mLSP in a manner similar to steps 771, 773, and/or 775.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: R=R1+k*(Ru−R1), wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

We claim:

1. An apparatus comprising:
a processor; and
at least one transmitter coupled to the processor and configured to:
transmit a backup Label Switched Path (LSP) multicast Resource Reservation Protocol-Traffic Engineering (mRSVP-TE) path request (PATH) message upstream,
wherein the backup LSP PATH message requests reservation of a first backup LSP to protect a first primary LSP configured to transmit multicast data, and
wherein the backup LSP PATH message is transmitted to support a facility mode one to many (1:N) fast reroute protocol.

2. The apparatus of claim 1, wherein the first primary LSP traverses the apparatus, and wherein the apparatus is positioned in a Multiprotocol Label Switching (MPLS) domain.

3. The apparatus of claim 1, wherein the apparatus is a terminal network node on the first primary LSP, and wherein the apparatus is positioned at the edge of a Multiprotocol Label Switching (MPLS) domain.

4. The apparatus of claim 1 further comprising a receiver coupled to the processor and configured to receive an mRSVP-TE reserve (RESV) message from an upstream node indicating the first backup LSP has been setup, wherein the first primary LSP is a sub-LSP of a primary multicast LSP (mLSP) tree, and wherein the first backup LSP is part of a backup mLSP tree protecting the primary mLSP tree.

5. The apparatus of claim 1, wherein the transmitter is further configured to transmit a primary LSP PATH message upstream, wherein the primary LSP PATH message requests reservation of a second primary LSP, wherein the processor is configured to determine whether the first backup LSP protects the second primary LSP, and wherein the processor does not cause the transmitter to transmit a second backup LSP PATH request for a second backup LSP to protect the second primary LSP when the first backup LSP protects the second primary LSP.

6. The apparatus of claim 1 further comprising a receiver coupled to the processor and configured to receive an mRSVP-TE reserve (RESV) message from an upstream node positioned along the first backup LSP in response to the backup LSP PATH message, wherein the RESV message comprises:
an inner label that identifies the first primary LSP; and
a backup LSP label assigned to the first backup LSP.

7. The apparatus of claim 6 further comprising a memory coupled to the processor, wherein the memory comprises a Forwarding Information Base (FIB), wherein the transmitter is further configured to transmit a primary LSP PATH message upstream to request reservation of the first primary LSP prior to sending the backup LSP PATH message, wherein the receiver is further configured to receive a primary LSP RESV message from an upstream node positioned along the primary LSP in response to the primary LSP PATH message, wherein the primary LSP RESV message comprises a primary LSP label assigned to the first primary LSP, and wherein the processor is configured to store the backup LSP label, the primary LSP label, and the inner label in the FIB.

8. The apparatus of claim 7, wherein the receiver is further configured to receive a multicast data packet comprising a packet label, and wherein when the packet label is the primary LSP label, the processor is further configured to remove the packet label and cause the transmitter to forward the multicast data packet based on a FIB entry associated with the primary LSP label.

9. The apparatus of claim 7, wherein the receiver is further configured to receive a multicast data packet comprising a packet label, and wherein when the packet label comprises a backup LSP downstream label, the processor is further configured to remove the backup LSP downstream label, obtain an inner label from the multicast data packet, and cause the transmitter to forward the multicast data packet based on a FIB entry associated with the inner label.

10. The apparatus of claim 9, wherein the first backup LSP protects a link of the first primary LSP, a node of the first primary LSP, or combinations thereof.

11. A computer program product comprising computer executable instructions stored on a non-transitory computer readable medium such that when executed by a processor cause a network element (NE) to:
receive a primary Label Switch Path (LSP) multicast Resource Reservation Protocol-Traffic Engineering (mRSVP-TE) path request (PATH) message from a first downstream node, wherein the primary LSP PATH message requests reservation of a primary LSP for downstream transmission of multicast data;
assign an inner label to the primary LSP for use in association with a backup LSP; and
send the inner label downstream via a backup mRSVP-TE reserve (RESV) message.

12. The computer program product of claim 11 further comprising instructions that cause the NE to receive a backup LSP PATH message from a second downstream node, wherein the backup LSP PATH message requests reservation of a backup LSP to protect the primary LSP, and wherein the backup RESV message is sent to the second downstream node in response to the backup LSP PATH message.

13. The computer program product of claim 12 further comprising instructions that cause the NE to:
assign a backup LSP label to the backup LSP;
send the backup LSP label to the second downstream node, wherein the second downstream node is positioned along the backup LSP;
assign a primary LSP label to the primary LSP; and
send the primary LSP label to the first downstream node, wherein the first downstream node is positioned along the primary LSP.

14. The computer program product of claim 13 further comprising instructions that cause the NE to:
monitor the primary LSP for downstream failure;
send a first multicast data packet downstream along the primary LSP while there is no primary LSP failure; and
send a second multicast data packet downstream along the backup LSP when there is a primary LSP failure.

15. The computer program product of claim 14, wherein sending the second multicast data packet along the backup LSP comprises:
encapsulating the second multicast data packets with the inner label;
encapsulating the second multicast data packet and the inner label with the backup LSP label; and
forwarding the second multicast data packet to the second downstream node.

16. A method of facility protection by a merge point (MP) comprising:
sending a first multicast Resource Reservation Protocol-Traffic Engineering (mRSVP-TE) path request (PATH) message toward a Point of Local Repair (PLR) over a primary route to initiate a primary Label Switch Path (LSP) setup;
checking whether a backup LSP has been created to protect a primary LSP between the PLR and the MP; and
initiating backup LSP setup when no backup LSP is available, wherein backup LSP setup comprises:
calculating a backup route by taking PLR as an endpoint of the backup LSP; and
sending a second PATH message toward the PLR hop-by-hop over the backup route.

17. The method of claim 16 further comprising:
receiving a packet forwarded hop-by-hop over the backup LSP;
merging the packet with traffic from the primary LSP by using an inner label of the packet that represents the primary LSP.

18. The method of claim 17, wherein the inner label is received from the PLR in a mRSVP-TE reserve (RESV) message.

19. The method of claim 18 further comprising:
initiating setup of additional primary LSPs between the PLR and the MP;
receiving additional inner labels for each additional primary LSP via additional RESV messages; and
sharing the backup LSP between the primary LSPs.

20. The method of claim 19, wherein the primary LSPs are sub-LSPs of a primary multicast LSP (mLSP) tree, and wherein the method further comprises using a Point to Multipoint (P2MP) tree comprising the backup LSP to protect the primary mLSP tree.

* * * * *